Dec. 15, 1931.  J. F. KEY  1,836,601
PRESSURE GAUGE
Filed April 18, 1927
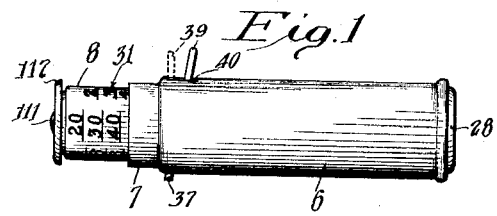
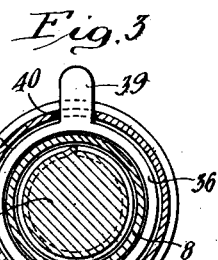
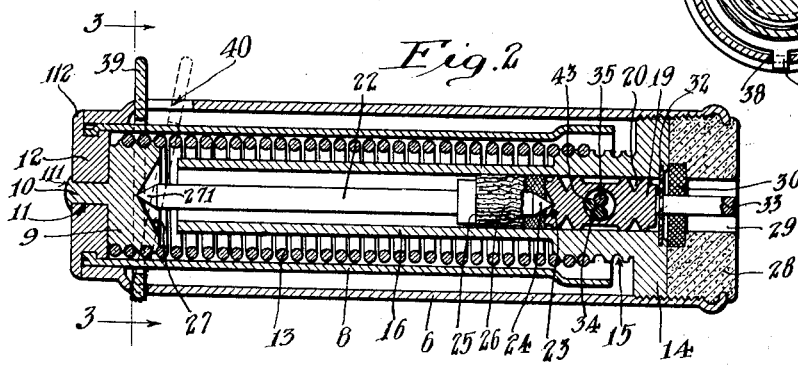
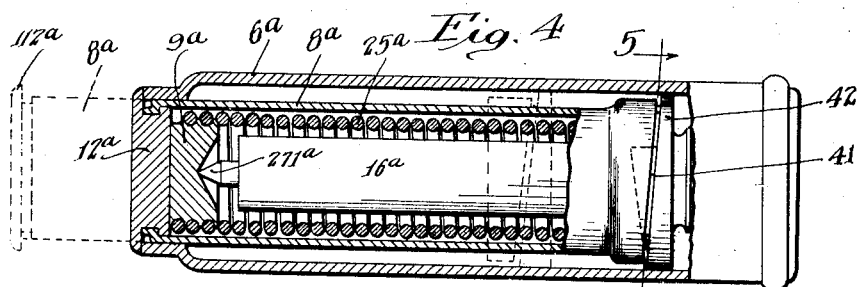
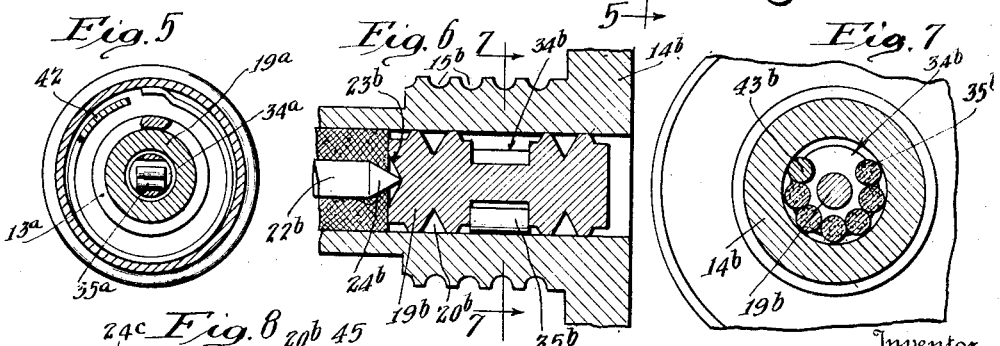
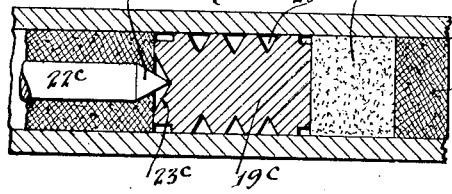
Inventor
James F. Key
By Lyon & Lyon
Attorneys Patented Dec. 15, 1931

1,836,601

UNITED STATES PATENT OFFICE

JAMES F. KEY, OF SIERRA MADRE, CALIFORNIA, ASSIGNOR TO FIRST TRUST & SAVINGS BANK OF PASADENA, AS TRUSTEE, OF PASADENA, CALIFORNIA

PRESSURE GAUGE

Application filed April 18, 1927. Serial No. 184,461.

This invention relates to pressure gauges of the type useful, for example, in ascertaining the amount of air pressure in pneumatic tires, and one of the principal objects of the invention is to provide a gauge of this character that will not deteriorate as rapidly as others now in use.

This invention relates more particularly, in some aspects thereof, to gauges of the type employing plungers, and is an improvement on the gauge disclosed in my copending application, filed April 1, 1925, Serial No. 19,815.

As distinguishing this invention from said prior disclosure, an object is to provide a construction which makes it possible to avoid movement of the plunger until the pressure in the tire has built up to a predetermined amount. This permits of finer calibration for a given movement of the plunger. This is quite an advantage in using the gauge to determine the pressure in balloon tires since the pressure used in balloon tires is comparatively low and should not vary more than a few pounds to get the best results from the tires.

Another object is to insure an evenness of pressure around the entire circumference of the plunger so that the plunger will not wear away faster on one side than the other.

Another object is to improve the lubrication of the plunger.

Another object is to make provision, in one form of the invention, for yieldingly holding the plunger against outward movement and to provide a means for releasably holding the plunger in the position to which it has been moved by air pressure.

Another object is to make provision, in another form of the invention, for holding the plunger in the position to which the air pressure moves it, while permitting the piston to be retracted by its retracting spring.

Other objects and advantages will appear in the subjoined detailed description.

The accompanying drawings illustrate the invention.

Figure 1 is a longitudinal view of a pressure gauge constructed in accordance with the provisions of this invention, the plunger being shown projected part way out of the barrel. The means for holding the plunger against retraction is shown in active position in solid lines and inactive position in dotted lines.

Figure 2 is an enlarged longitudinal mid section of the gauge showing the parts retracted. The means for holding the plunger against retraction is shown in inactive position in solid lines and in active position, in dotted lines.

Figure 3 is an elevation, mainly in section, from the line indicated by 3—3, Figure 2.

Figure 4 is a longitudinal view, mainly in mid section, of a slightly different form of gauge embodying the invention, the operating parts being shown in solid lines in their retracted positions. Broken lines show the plunger in a pressure indicating position.

Figure 5 is a sectional view on the line indicated by 5—5, Figure 4.

Figure 6 is an enlarged fragmental longitudinal section showing a modified form of piston. Fragments of the cylinder and piston rod are also shown.

Figure 7 is a sectional view of Figure 6 on the line indicated by 7—7.

Figure 8 is a longitudinal section of a further modification of the piston, a fragment of the cylinder also being shown.

First referring to Figures 1, 2 and 3 of the drawings for the form of the invention therein illustrated, there is provided a barrel or case 6, preferably of tubular construction and contracted slightly at one end as indicated at 7 to form an annular guide for a hollow plunger 8 which is thus slidably mounted in the barrel 6.

A means is provided for yieldingly holding the plunger 8 retracted, as in Figure 2, and this means is constructed as follows: connected with the outer end of the plunger 8 is a spring seat 9, said seat being connected to the plunger in any suitable manner. In this instance, the connection between the plunger and spring seat is effected by a stud 10 projecting from the seat 9 through a hole 11 in the head 12 of the plunger. The stud 10 is headed over as indicated at 111 against the outer face of the head 12. The stud 10 rotatably connects the seat 9 with the head.

Connected with the seat 9 is one end of a coil spring 13 and the other end of said spring connects with a second spring seat 14. The spring seat 14 is fixed in the barrel 6, being connected, in this instance, to said barrel by screw threads.

The spring 13 is always under tension, even when the plunger 8 is in its retracted position, as shown in Figure 2, and a suitable means is provided to limit inward movement of the plunger 8. Though this movement limiting means may be of any suitable construction, I at present prefer to construct the head 12 with an annular shoulder 112 adapted to engage the reduced portion 7 of the barrel. Thus, when the plunger 8 is drawn as far as possible into the barrel, the head 12 covers the adjacent end of the barrel and an added advantage of this is the prevention of the entrance of dirt and dust between the plunger and the guide 7, thus preventing to a large extent the entrance of dirt and dust into the interior of the barrel.

In the instance shown in the drawings, the spring seat 14 is in the form of a screw thread 15 on a cylinder 16, which extends to within a slight distance of the spring seat 9 when the plunger 8 is telescoped within the barrel 6. Within the cylinder 16 is a piston 19 constructed of any suitable material. In the present instance, the body of the piston is of metal and is provided with annular grooves 20. The piston rod is indicated at 22, and, preferably, said rod loosely engages the piston 19 so that any deflection of the rod 22 will not cause greater lateral pressure of the piston against one side of the cylinder than the opposite side. In the present instance, the piston 19 is provided in its inner end with a concavity 23, in which seats a conical end 24 of the rod 22. Between the piston 19 and an annular shoulder 25 on the rod 22 is positioned a swab 26 of felt or other suitable relatively soft material. The swab surrounds the rod and fits the cylinder so as to wipe any grit that may be on the wall of said cylinder therefrom in advance of the outward stroke of the piston. The rod 22 is preferably loosely connected with the spring seat 9 and to provide for this, said spring seat has a concavity 27 in its inner face and the rod 22 is provided with a conical end 271 which seats in the concavity 27. The wall of the concavity is conical.

Inserted in the barrel 6 is a resilient sealing member 28 having an opening 29 alined with the bore of the cylinder 16 so as to admit compressed air to said cylinder to effect such movement of the piston as will move the plunger 8 out of the barrel. It is preferable that the opening 29 be provided with an air strainer 30 which may be constructed of fibrous material, such, for example, as felt.

The strainer 30 prevents the entrance of dirt into the adjacent end of the cylinder behind the piston.

The barrel 8 may have a graduated scale as indicated at 31 in the customary manner of graduating pressure gauges of this character.

Mounted in the cylinder 16 close to the air strainer 30 is a perforated disk 32 to which is connected a stud 33 that projects through the strainer 30 to the outer end of the opening 29. The outer end of the stud 33 is adapted to engage the valve stem of a pneumatic tire to push the stem so as to open the valve when it is desired to inflate the tire.

The piston 19 carries graphite for lubricating the cylinder wall and, for this purpose, said piston is provided with a transversely extending chamber 34 which opens to opposite sides of the piston. In this instance, the chamber 34 is circular in cross section and loosely mounted therein is a lubricating element or elements 35 formed of graphite or other suitable substance. In this instance, the lubricating elements 35 are of stick form and cylindrical in shape and the length is substantially as great as the diameter of the piston so that the ends of the elements 35 rub against the cylinder wall so as to leave a deposit of graphite upon said cylinder wall, thus lubricating the same so as to reduce friction between the piston and cylinder to a minimum.

The advantage of employing the graphite in the form of a stick instead of in flake form, as is customary for lubricating a surface, is that the graphite is applied to the friction surfaces in smaller amounts and it is rubbed onto the surfaces and cannot so readily escape past the piston as though it were in flake form. Furthermore, if granular or flake graphite were employed, to be effective, the chambers in which the graphite is placed would need to be entirely full of the granular or flake graphite at all times, where as with the stick form of graphite, proper lubrication occurs so long as there is any appreciable amount of the stick remaining.

In order that, when the plunger 8 is moved outwardly by admitting compressed air through the opening 29, the plunger will remain in the pressure indicating position, as is desirable when applying the gauge directly to the valve stem of the tire, a means is provided for holding the plunger in the position to which it has been forced. This means, in this instance, is constructed as follows: Surrounding the plunger 8 is a clamping ring 36 which is loosely anchored to the barrel by a lug 37 which projects through an opening 38 in the barrel 6. The lug 37 fits loosely in the opening 38 and thus pivotally connects the ring 36 with the barrel. The ring 36 is provided with a projection 39 that extends through a slot 40 in the barrel 6. The projection constitutes an operating member and the slot 40 is of sufficient length to permit the ring 36 to be moved from a position at right angles to the axis of the plunger into a position in which the ring extends aslant to the plunger 8 with the inner face of the ring engaged with the outer face of the plunger. When the ring 36 is in the position indicated in broken lines in Figure 2 and the shoulder 112 is spaced from the barrel 6, the tension of the spring 25 maintains the ring 36 clamped upon the plunger 8 and prevents retraction of said plunger. When it is desired that the spring retract the plunger, the operator presses the projection 39 to the left in Figure 2, thus disengaging the inner face of the ring from the plunger.

It is to be understood that the gauge may be made without the ring 36 in event that it is not desired to hold the plunger in pressure indicating position when using the gauge. For example, if the gauge constitutes a part of a compressed air nozzle of the type at present in use, the ring 37 may be omitted, since the pressure indicating member is held in indicating position by the air pressure within the nozzle.

The invention operates as follows: Assuming the parts to be in the positions shown in solid lines in Figure 2, the gauge will be applied to the air admission valve of a tire, for example, so as to bring the stud 33 into engagement with the valve stem, thus opening the valve and admitting compressed air from the tire through the opening 29 into the bore of the cylinder behind the piston 19. The air pressure thrusts the piston outward, thus pushing outward the plunger 8 against the tension of the spring 25. It may be here stated that the tension in the spring 25 is of a predetermined degree so that in calibrating the plunger the calibration need not start with the zero pressure but with a unit of pressure corresponding to that required to move the plunger a predetermined distance outwardly against the tension of the spring. When the plunger 8 has been protruded from the barrel as far as the air pressure will operate it, the operator presses the member 39 to the right in Figure 2 from the solid line position to the dotted line position so as to clamp the plunger in its pressure indicating position. The operator then removes the gauge from the valve stem and holds it in a convenient position to read off the pressure as indicated by the calibration nearest to the end of the reduced portion 7 of the barrel. After reading the pressure, the operator presses the member 39 to the left in Figure 2 so as to permit the spring to retract the plunger and the gauge is then in condition for again applying to a valve stem to read the pressure.

In the outward movement of the piston, the lubricating element 35 deposits lubricant upon the cylinder wall. It will be noted that the swab 26 moves outward in the cylinder in advance of the piston, thus wiping dust and other particles detrimental to the friction surfaces of the piston and cylinder from the cylinder wall. By thus wiping said particles out of the cylinder in advance of the piston scouring of the cylinder wall and cutting of the periphery of the piston are prevented and the amount of friction between the piston and cylinder remains practically constant over a long period of time during which the gauge is in use, thus insuring accuracy in the indication of the air pressure in tires with which the gauge is used.

It is to be noted that relative lateral movement between the rod 22 and spring seat 9 and between said rod and the piston will not tend to force the piston harder against one side of the cylinder than the opposite side, thus insuring that wear of the piston and cylinder will be uniform, and again insuring long life of the gauge and accuracy thereof during said life.

Now referring more particularly to Figures 4 and 5 of the drawings for the modifications there illustrated, the parts that are the functional equivalent of those described above are indicated by the same reference characters with the addition of the letter $a$. One important difference between the above described form of the invention and that shown in Figures 4 and 5 is that the spring seat $9a$ is not secured to the head $12a$, but is free therefrom so that after the plunger $8a$ has been moved into a pressure indicating position, as indicated in broken lines in Figure 4, and upon release of the air pressure the spring $25a$ will retract the piston rod, but not the plunger $8a$, thus permitting the plunger to remain in the pressure indicating position until the operator presses it inwardly. In this form of the invention, I have shown means for yieldingly holding the plunger $8a$ against the inward movement so that if the operator, after applying the gauge to the tire valve, should have the gauge in an upright position with the head $12a$ pointed up, the plunger $8a$ will not be caused to descend by gravity within the barrel $6a$. This means is constructed as follows: the inner end portion of the plunger $8a$ has a spiral kerf 41 and that part 42 of the plunger that lies between the kerf and the adjacent end of the plunger is bent outwardly to form a curved friction member to yieldingly engage the inner face of the barrel $6a$, it being understood that the member 42 is of spring character.

It will now be understood that the gauge will be applied to the tire inflating valve, to ascertain the air pressure within the tire, in the manner above described in the form of the invention shown in Figures 1 to 3 inclusive, and that when the plunger $8a$ has been moved into position to indicate the air pressure within the tire and the pressure then released, the spring 25a will retract the piston and the plunger will be maintained in indicating position by the friction between the member 42 and the barrel 6a. Before the gauge is again applied to ascertain the pressure of air in a tire, the operator will press the plunger 8a inwardly to retract the same.

Now referring more particularly to Figures 6 and 7 of the drawings, the elements there illustrated and corresponding to those previously described are indicated by the same reference characters with the addition of the letter b. In this instance, the piston 19b is provided with an annular recess 34b approximately mid way between the ends of said piston, said recess constituting a chamber to hold one or more lubricating elements 35b. The lubricating elements 35b are cylindrical and are positioned lengthwise of the piston so that the periphery of the lubricating elements will engage the inner face of the cylinder wall. When the piston 19b moves endwise, it carries with it the elements 35b, thus depositing lubricant upon the cylinder wall. The lubricating elements 35b may be constructed of the same substance mentioned above for the elements 35. It is to be understood that, in order to keep the elements 35 or 35b, as the case may be, from sticking to the walls of the chamber in which they are placed, I may provide the chamber 34 with a metal member 43 and the chamber 34b with a metal member 43b. These members 43, 43b are cylindrical and are of sufficient weight to knock loose the lubricating elements if the same should tend to stick to the walls of the chambers 34, 34b.

Now referring more particularly to Figure 8 of the drawings, the elements that functionally correspond to those described in connection with Figures 1 to 3 are indicated by the same reference characters with the addition of the letter c. In this instance, the piston 19c is solid and there is provided a swab 44 and interposed between the swab 44 and the piston 19c is a lubricating element 45 formed of or containing graphite. The element 45 may be graphite in stick form, such as is used, for example, in lead pencils and, when made of such material, it may be referred to as "pencil lead".

I claim:

1. An elongated pressure gauge comprising a barrel, a hollow graduated plunger slidably mounted in the barrel and provided with a head, said head provided with a flange to engage the adjacent end of the barrel when the plunger is retracted, a coil spring, a means connecting one end of the spring to the barrel, a means having a concavity connecting the opposite end of the spring to the plunger, a cylinder inside of the plunger rigid with the barrel, a piston in the cylinder provided with a concavity in one end and a piston rod provided with pointed ends engaging the last named means and piston within their respective concavities, and a swab on the piston rod.

2. The pressure gauge piston described, comprising a cylindrical body provided with a chamber opening to the periphery of said body, and a solid lubricating element of stick form in said chamber.

3. The pressure gauge piston described, comprising a cylindrical body provided with a chamber extending transversely of the body and opening to the periphery of said body, and a solid lubricating element of stick form in said chamber.

4. The pressure gauge piston described, comprising a cylindrical body provided with a chamber opening to the periphery of said body, a solid lubricating element in said chamber, and a metal member in the chamber to engage and dislodge the lubricating element from the wall of said chamber when the piston reciprocates.

5. An elongated pressure gauge comprising a barrel, a hollow graduated plunger slidably mounted in the barrel and provided with a head, said head provided with a flange to engage the adjacent end of the barrel when the plunger is retracted, a coil spring under tension when said flange is engaged with the barrel, a means connecting one end of the spring to the barrel, a means connecting the opposite end of the spring to the plunger, a cylinder inside of the plunger rigid with the barrel, a piston in the cylinder, and a piston rod engaging the last named means and the piston.

Signed at Los Angeles this 1st day of April, 1927.

JAMES F. KEY.